United States Patent
Inoue et al.

(10) Patent No.: US 12,494,190 B2
(45) Date of Patent: Dec. 9, 2025

(54) MOBILE TERMINAL

(71) Applicant: HONDA MOTOR CO., LTD., Tokyo (JP)

(72) Inventors: Toshio Inoue, Wako (JP); Xun Wang, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 162 days.

(21) Appl. No.: 17/914,578

(22) PCT Filed: Mar. 30, 2021

(86) PCT No.: PCT/JP2021/013660
§ 371 (c)(1),
(2) Date: Sep. 26, 2022

(87) PCT Pub. No.: WO2021/201016
PCT Pub. Date: Oct. 7, 2021

(65) Prior Publication Data
US 2023/0206893 A1   Jun. 29, 2023

(30) Foreign Application Priority Data

Mar. 31, 2020   (JP) ................................ 2020-062581

(51) Int. Cl.
*G10K 11/178* (2006.01)
(52) U.S. Cl.
CPC .. *G10K 11/17883* (2018.01); *G10K 11/17881* (2018.01)
(58) Field of Classification Search
CPC ..................... G10K 11/17883; G10K 11/17881
See application file for complete search history.

(56) References Cited

U.S. PATENT DOCUMENTS

2005/0094826 A1   5/2005  Morishita
2006/0269078 A1*  11/2006 Sakamoto .......... G10K 11/1783
                                                               381/71.1
(Continued)

FOREIGN PATENT DOCUMENTS

CN      110022513 A        7/2019
GB        2476470 A    *   6/2011    ............. G10K 15/02
(Continued)

OTHER PUBLICATIONS

Machine Translation of Original publication, "JP 2012131244A Active Sound Control System and Active Sound Control Program", Jul. 12, 2012, worldwide.espacenet.com, pp. 1-7. (Year: 2012).*

(Continued)

*Primary Examiner* — Daniel R Sellers
(74) *Attorney, Agent, or Firm* — Carrier, Shende & Associates P.C.; Joseph P. Carrier; Jeffrey T. Gedeon

(57) ABSTRACT

Provided is a mobile terminal capable of reducing cost for carrying out active noise control and/or active sound effect control. Provided is a mobile terminal that carries out active noise control in which, in order to reduce driving source sound transmitted from a driving source to the vehicle interior of a vehicle, a first control signal for outputting cancellation sound from a speaker provided in the vehicle interior is generated, and/or active sound effect control in which a second control signal for outputting from the speaker a sound effect resembling the driving source sound is generated, wherein the vehicle has an on-vehicle system that controls the speaker, and the first control signal and/or the second control signal is transmitted to the on-vehicle system.

1 Claim, 16 Drawing Sheets

(56) References Cited

U.S. PATENT DOCUMENTS

| | | | |
|---|---|---|---|
| 2007/0160227 A1* | 7/2007 | Kogure | G10K 11/17883 |
| | | | 381/86 |
| 2011/0087403 A1 | 4/2011 | Fujikawa | |
| 2013/0223643 A1 | 8/2013 | Sato et al. | |
| 2015/0199955 A1* | 7/2015 | Draganic | G08B 6/00 |
| | | | 381/86 |
| 2018/0226064 A1* | 8/2018 | Seagriff | H04L 63/0428 |
| 2020/0062237 A1* | 2/2020 | Ayesh | G10K 11/178 |
| 2020/0083856 A1* | 3/2020 | Tin Than | G10K 11/17821 |
| 2021/0289286 A1* | 9/2021 | Marin | G10K 15/02 |

FOREIGN PATENT DOCUMENTS

| | | | |
|---|---|---|---|
| JP | 2000-099037 A | | 4/2000 |
| JP | 2005-134749 A | | 5/2005 |
| JP | 2007-185994 A | | 7/2007 |
| JP | 2008-213755 A | | 9/2008 |
| JP | 2011-085662 A | | 4/2011 |
| JP | 2012-131244 A | | 7/2012 |
| JP | 2013-177095 A | | 9/2013 |
| KR | 101405195 B1 | * | 6/2014 |

OTHER PUBLICATIONS

Machine Translation of Original publication, "Kr 101405195B1", Jun. 10, 2014, worldwide.espacenet.com, pp. 1-5. (Year: 2014).*

Office Action dated Aug. 1, 2023 issues in the corresponding Japanese Patent Application No. 2022-512579 with the English machine translation thereof.

PCT/ISA/210 from International Application PCT/JP2021/013660 with the English translation thereof.

Office Action dated Mar. 25, 2025 issued in the corresponding Chinese Patent Application No. 202180026692.5 with the English machine translation thereof.

* cited by examiner

MOBILE TERMINAL

TECHNICAL FIELD

The present invention relates to a mobile terminal that performs at least one of active noise control or active sound effect control.

BACKGROUND ART

JP 2000-099037 A discloses an active vibration noise suppressing device for suppressing vibration noise generated in synchronization with the rotational speed or the like of an engine output shaft of a vehicle.

SUMMARY OF THE INVENTION

In the technique disclosed in JP 2000-099037 A, it is necessary to mount a dedicated control unit for the active vibration noise suppressing device on the vehicle, and there is a problem of increased cost.

The present invention has been made in order to solve the above-described problem, and an object of the present invention is to provide a mobile terminal which is capable of reducing the cost of performing at least one of active noise control or active sound effect control.

According to an aspect of the present invention, there is provided a mobile terminal that performs at least one of active noise control or active sound effect control, the active noise control generating a first control signal for causing a speaker provided in a vehicle compartment of a vehicle to output a canceling sound in order to reduce a drive source sound transmitted from a drive source into the vehicle compartment, the active sound effect control generating a second control signal for causing the speaker to output a sound effect simulating the drive source sound, wherein the vehicle includes an in-vehicle system configured to control the speaker, and at least one of the first control signal or the second control signal is transmitted to the in-vehicle system.

According to the present invention, it is possible to reduce the cost of performing at least one of the active noise control or the active sound effect control.

DESCRIPTION OF THE INVENTION

First Embodiment

Figure 1:
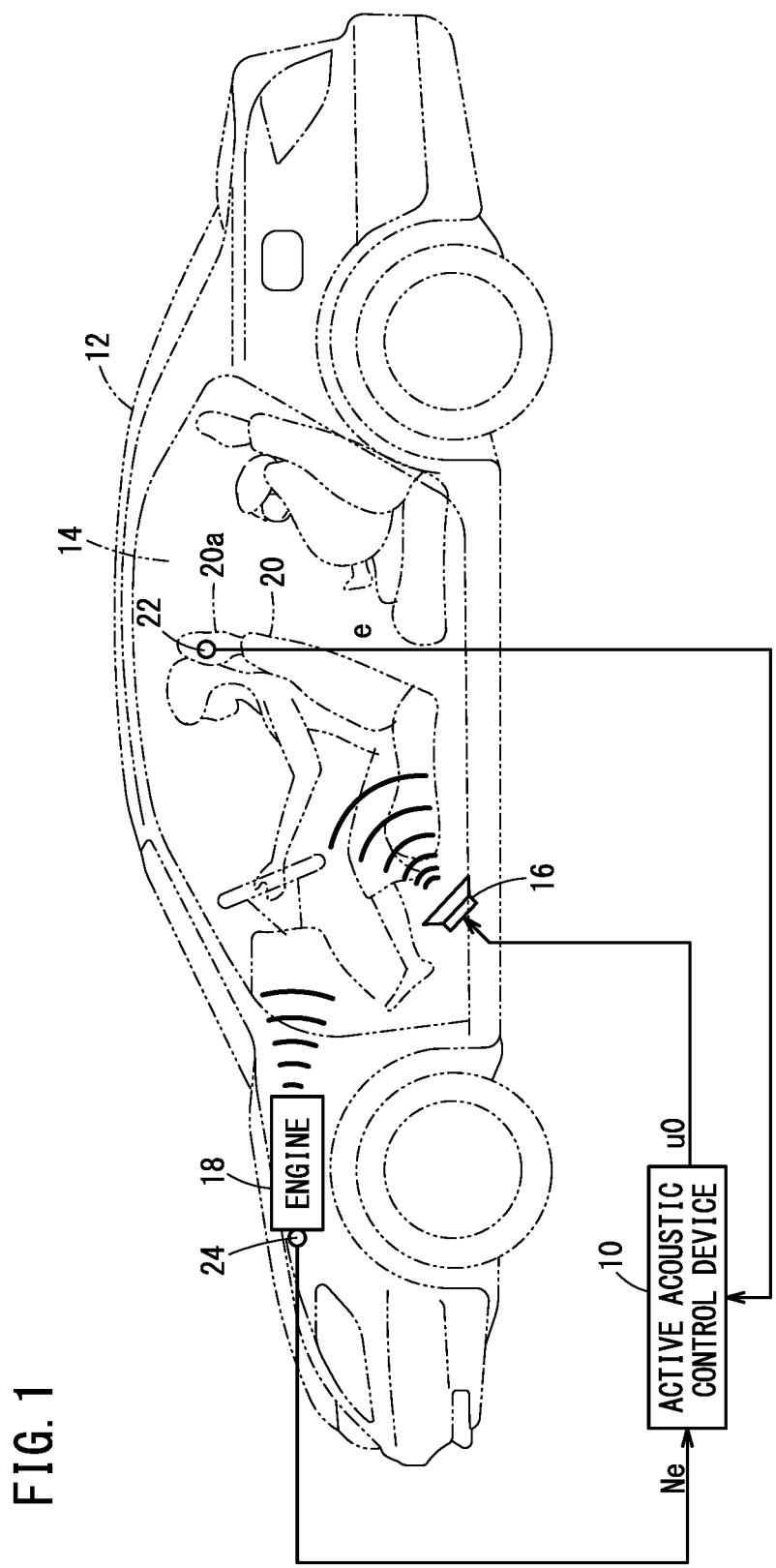
FIG. 1 is a diagram illustrating an overview of active acoustic control.

FIG. 1 is a diagram illustrating an outline of active acoustic control performed by an active acoustic control device 10.

The active acoustic control device 10 according to the present embodiment performs active noise control in the active acoustic control. In the active acoustic control, a canceling sound is output from a speaker 16 provided in a vehicle compartment 14 of a vehicle 12, and the control reduces engine muffled sounds (hereinafter referred to as noise) transmitted to a vehicle occupant in the vehicle compartment 14 due to vibration of an engine 18.

The active acoustic control device 10 generates a control signal u0 for outputting a canceling sound from the speaker 16 based on an error signal e output from a microphone 22 provided on a headrest 20a of a seat 20 in the vehicle compartment 14 and an engine rotational speed Ne detected by an engine rotational speed sensor 24. The error signal e is a signal output according to a cancellation error noise from the microphone 22 that has detected the cancellation error noise in which the canceling sound and the noise are combined. The control signal u0 corresponds to a first control signal of the present invention.

Figure 2:
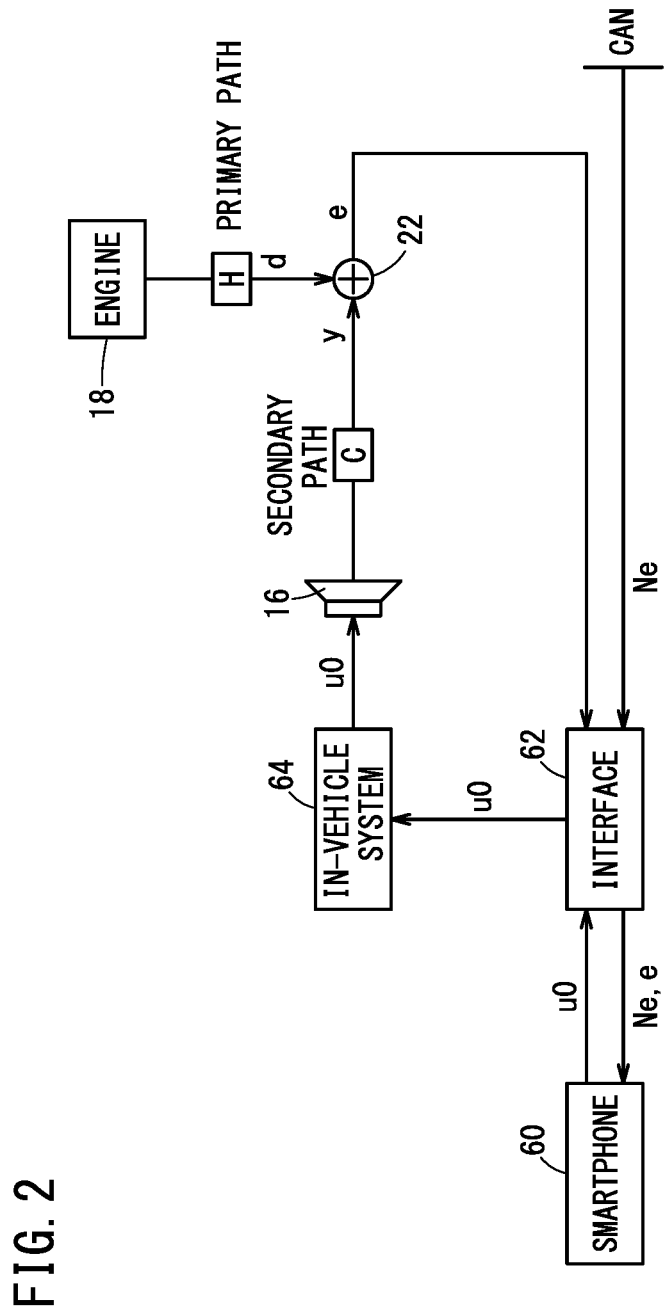
FIG. 2 is an overall system diagram.

FIG. 2 is an overall system diagram of the present embodiment. In the present embodiment, a smartphone 60 on which the active acoustic control program is installed functions as the active acoustic control device 10. The smartphone 60 corresponds to a mobile terminal of the present invention. The smartphone 60 is connected to an interface 62 by wire.

The interface 62 is provided on a CAN. The engine rotational speed Ne is input to the interface 62 via the CAN. The interface 62 is connected to an in-vehicle system 64 and the microphone 22 by wire. The interface 62 transmits the input engine rotational speed Ne to the smartphone 60. The interface 62 transmits the error signal e input from the microphone 22 to the smartphone 60. The interface 62 transmits the control signal u0 input from the smartphone 60 to the in-vehicle system 64. The in-vehicle system 64 controls the speaker 16 to output the canceling sound corresponding to the control signal u0.

[Configuration of Smartphone]

Figure 3:
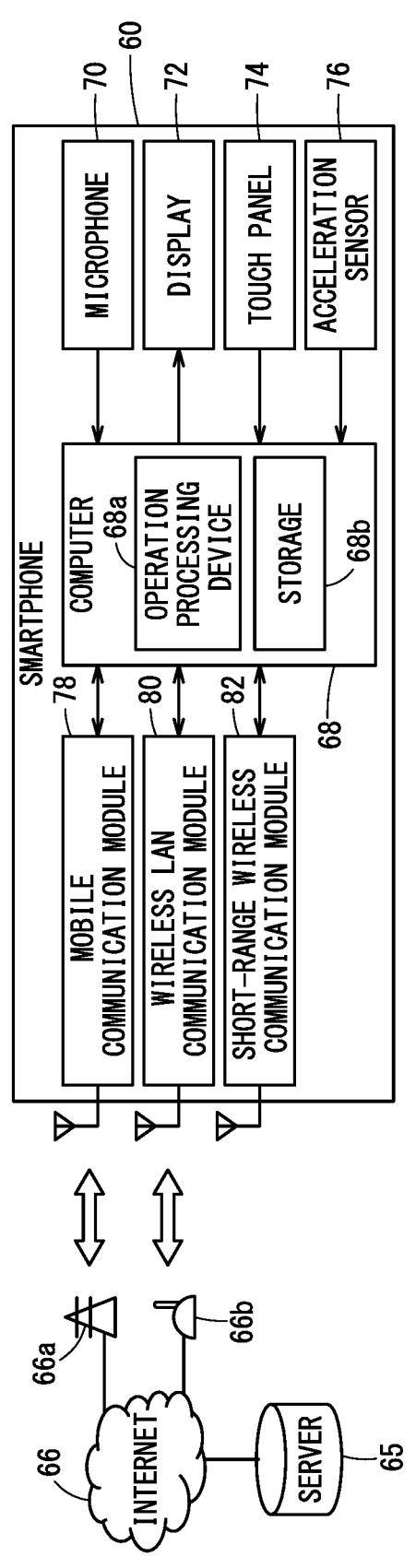
FIG. 3 is a block diagram of a smartphone.

FIG. 3 is a block diagram of the smartphone 60. The smartphone 60 downloads an active acoustic control program from a server 65 via the Internet 66. The downloaded active acoustic control program is installed on the smartphone 60.

The smartphone 60 includes a computer 68, a microphone 70, a display 72, a touch panel 74, an acceleration sensor 76, a mobile communication module 78, a wireless LAN communication module 80, and a short-range wireless communication module 82.

The computer 68 includes an operation processing device 68a and a storage 68b. The operation processing device 68a includes a processor such as a central processing unit (CPU) or a microprocessing unit (MPU), and a memory including a tangible non-transitory or transitory computer-readable recording medium such as a ROM or a RAM. The storage 68*b* is a tangible non-transitory computer-readable recording medium such as a hard disk, a solid state drive (SSD), or the like.

When the active acoustic control program is installed on the smartphone 60, the active acoustic control program is stored in the storage 68*b*. The smartphone 60 functions as the active acoustic control device 10 when the operation processing device 68*a* performs active acoustic control processing in accordance with the active acoustic control program stored in the storage 68*b*.

The microphone 70 collects sound around the smartphone 60. The display 72 is, for example, a display device using liquid crystal, organic electroluminescence (organic EL), or the like. The touch panel 74 is a pointing device that detects a position on the display 72 touched by a user's finger or the like. The acceleration sensor 76 detects the acceleration acting on the smartphone 60. When the smartphone 60 is in the vehicle compartment 14, the acceleration detected by the acceleration sensor 76 can be regarded as the acceleration of the vehicle 12.

The mobile communication module 78 is a module that communicates with a base station 66*a* connected to the Internet 66 by cellular communication. The wireless LAN communication module 80 is a module that communicates with an access point 66*b* connected to the Internet 66 by wireless LAN communication. Thus, the smartphone 60 can transmit and receive data to and from the server 65 via the Internet 66. The short-range wireless communication module 82 is a module that communicates with the in-vehicle system 64 by short-range wireless communication standard such as Bluetooth (registered trademark).

[Configuration of In-Vehicle System]

Figure 4:
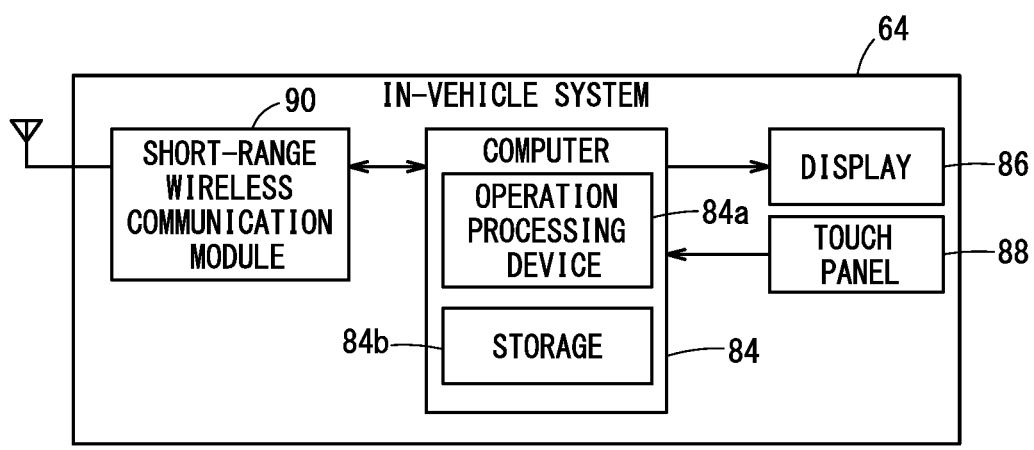
FIG. 4 is a block diagram of an in-vehicle system.

FIG. 4 is a block diagram of the in-vehicle system 64. The in-vehicle system 64 includes a computer 84, a display 86, a touch panel 88, and a short-range wireless communication module 90.

The computer 84 includes an operation processing device 84*a* and a storage 84*b*. The operation processing device 84*a* includes a processor such as a central processing unit (CPU) or a microprocessing unit (MPU), and a memory including a tangible non-transitory or transitory computer-readable recording medium such as a ROM or a RAM. The storage 84*b* is a tangible non-transitory computer-readable recording medium such as a hard disk, a solid state drive (SSD), or the like.

The display 86 is, for example, a display device using liquid crystal, organic electroluminescence (organic EL), or the like. The touch panel 88 is a pointing device that detects a position on the display 86 touched by a user's finger or the like. The short-range wireless communication module 90 is a module that communicates with the smartphone 60 by short-range wireless communication standard such as Bluetooth (registered trademark).

[Active Acoustic Control Device]

Figure 5:
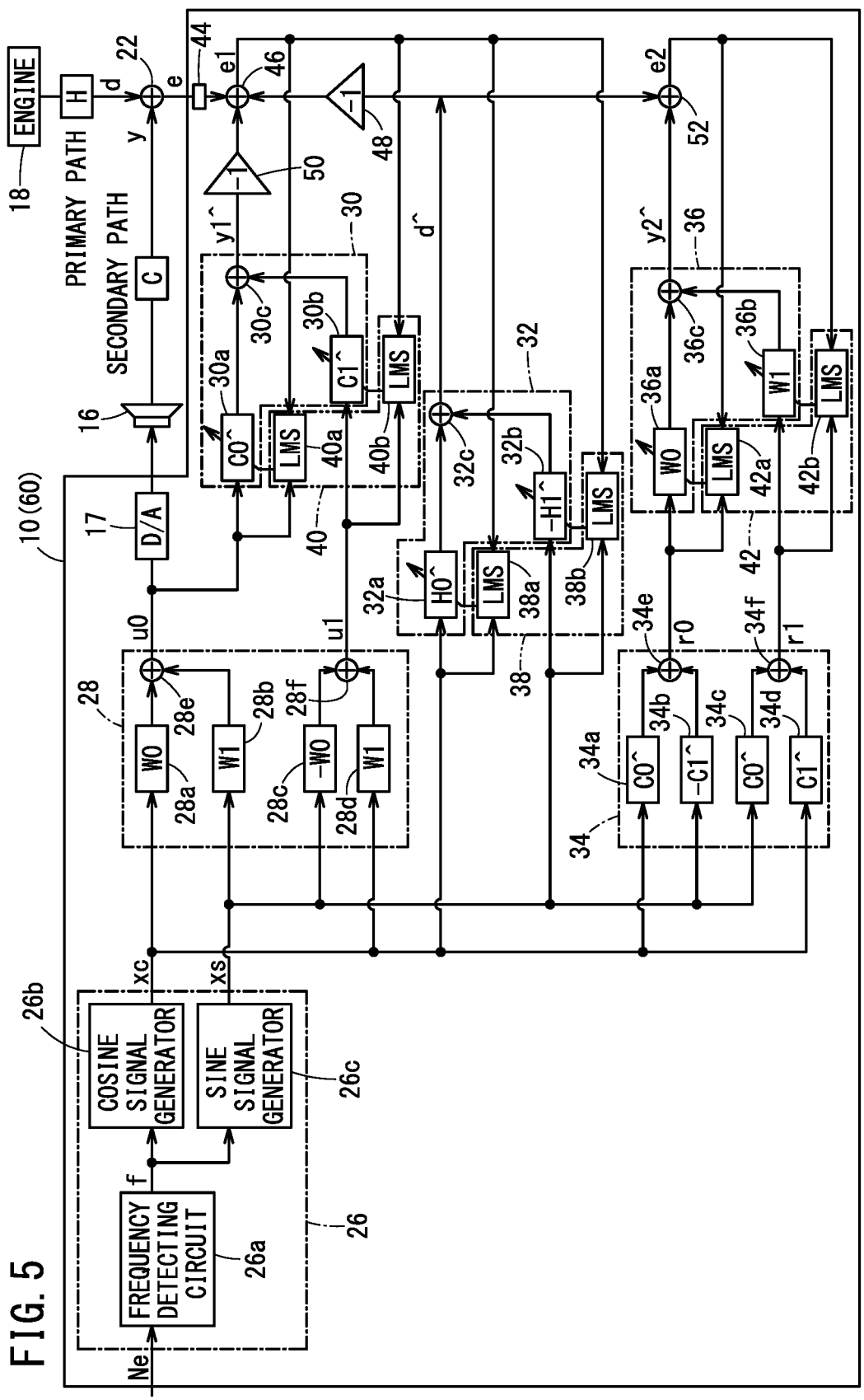
FIG. 5 is a block diagram of an active acoustic control device.

FIG. 5 is a block diagram of the active acoustic control device 10. A transfer path from the engine 18 to the microphone 22 may hereinafter be referred to as s primary path. Further, a transfer path from the speaker 16 to the microphone 22 may hereinafter be referred to as a secondary path.

The active acoustic control device 10 includes a basic signal generating unit 26, a control signal generating unit 28, a first estimated cancellation signal generating unit 30, an estimated noise signal generating unit 32, a reference signal generating unit 34, a second estimated cancellation signal generating unit 36, a primary path filter coefficient updating unit 38, a secondary path filter coefficient updating unit 40, and a control filter coefficient updating unit 42.

The basic signal generating unit 26 generates basic signals xc and xs based on the engine rotational speed Ne. The basic signal generating unit 26 includes a frequency detecting circuit 26*a*, a cosine signal generator 26*b*, and a sine signal generator 26*c*.

The frequency detecting circuit 26*a* detects a control target frequency f. The frequency detecting circuit 26*a* corresponds to a frequency acquiring unit of the present invention. The control target frequency f is a frequency of a muffled sound of the engine 18 detected based on the engine rotational speed Ne. The cosine signal generator 26*b* generates a basic signal xc $(=\cos(2\pi ft))$ which is a cosine signal of the control target frequency f. The sine signal generator 26*c* generates a basic signal xs $(=\sin(2\pi ft))$, which is a sine signal of the control target frequency f. Here, t denotes time.

The control signal generating unit 28 generates the control signals u0 and u1 based on the basic signals xc and xs. The control signal generating unit 28 includes a first control filter 28*a*, a second control filter 28*b*, a third control filter 28*c*, a fourth control filter 28*d*, an adder 28*e*, and an adder 28*f*.

In the control signal generating unit 28, a SAN filter is used as a control filter W. The control filter W includes a filter W0 for the basic signal xc and a filter W1 for the basic signal xs. The control filter W is optimized by updating a coefficient W0 of the filter W0 and a coefficient W1 of the filter W1 by the control filter coefficient updating unit 42 to be described later.

The first control filter 28*a* has the filter coefficient W0. The second control filter 28*b* has the filter coefficient W1. The third control filter 28*c* has the filter coefficient −W0. The fourth control filter 28*d* has the filter coefficient W1.

The basic signal xc corrected by the first control filter 28*a* and the basic signal xs corrected by the second control filter 28*b* are added by the adder 28*e* to generate the control signal u0. The basic signal xs corrected by the third control filter 28*c* and the basic signal xc corrected by the fourth control filter 28*d* are added by the adder 28*f* to generate the control signal u1.

The control signal u0 is converted into an analog signal by a digital-to-analog convertor 17 and output to the speaker 16. The speaker 16 is controlled based on the control signal u0, and the canceling sound is output from the speaker 16.

The first estimated cancellation signal generating unit 30 generates a first estimated cancellation signal y1^ based on the control signals u0 and u1. The first estimated cancellation signal generating unit 30 includes a first secondary path filter 30*a*, a second secondary path filter 30*b*, and an adder 30*c*.

In the first estimated cancellation signal generating unit 30, a SAN filter is used as a secondary path filter C^. In the secondary path filter coefficient updating unit 40 to be described later, a coefficient (C0^+iC1^) of the secondary path filter C^ is updated, whereby a secondary path transfer characteristic C is identified as a secondary path filter C^.

The first secondary path filter 30*a* has a filter coefficient C0^ which is a real part of the coefficient of the secondary path filter C^. The second secondary path filter 30*b* has a filter coefficient C1^ which is an imaginary part of the coefficient of the secondary path filter C^. The control signal u0 corrected by the first secondary path filter 30*a* and the control signal u1 corrected by the second secondary path filter 30*b* are added by the adder 30*c* to generate a first estimated cancellation signal y1^. The first estimated cancellation signal y1^ is an estimated signal of a signal corresponding to the canceling sound y input to the microphone 22.

The estimated noise signal generating unit 32 generates an estimated noise signal d^ based on the basic signals xc and xs. The estimated noise signal generating unit 32 includes a first primary path filter 32a, a second primary path filter 32b, and an adder 32c.

In the estimated noise signal generating unit 32, a SAN filter is used as a primary path filter H^. In the primary path filter coefficient updating unit 38 to be described later, a coefficient (H0^+iH1^) of the primary path filter H^ is updated, whereby a transfer characteristic H of the primary path (hereinafter referred to as a primary path transfer characteristic H) is identified as the primary path filter H^.

The first primary path filter 32a has a filter coefficient H0^ which is a real part of the coefficient of the primary path filter H^. The second primary path filter 32b has a filter coefficient −H1^ obtained by inverting the polarity of an imaginary part of the coefficient of the primary path filter H^. The basic signal xc corrected by the first primary path filter 32a and the basic signal xs corrected by the second primary path filter 32b are added by the adder 32c to generate an estimated noise signal d^. The estimated noise signal d^ is an estimated signal of a signal corresponding to a noise d input to the microphone 22.

The reference signal generating unit 34 generates reference signals r0 and r1 based on the basic signals xc and xs. The reference signal generating unit 34 includes a third secondary path filter 34a, a fourth secondary path filter 34b, a fifth secondary path filter 34c, a sixth secondary path filter 34d, an adder 34e, and an adder 34f.

In the reference signal generating unit 34, a SAN filter is used as a secondary path filter C^. In the secondary path filter coefficient updating unit 40 to be described later, a coefficient (C0^+iC1^) of the secondary path filter C^ is updated, whereby a transfer characteristic C of the secondary path (hereinafter referred to as a secondary path transfer characteristic C) is identified as the secondary path filter C^.

The third secondary path filter 34a has a filter coefficient C0^ which is a real part of the coefficient of the secondary path filter C^. The fourth secondary path filter 34b has a filter coefficient −C1^ obtained by inverting the polarity of an imaginary part of the coefficient of the secondary path filter C^. The fifth secondary path filter 34c has a filter coefficient C0^ which is the real part of the coefficient of the secondary path filter C^. The sixth secondary path filter 34d has a filter coefficient C1^ which is the imaginary part of the coefficient of the secondary path filter C^.

The basic signal xc corrected by the third secondary path filter 34a and the basic signal xs corrected by the fourth secondary path filter 34b are added by the adder 34e to generate the reference signal r0. The basic signal xs corrected by the fifth secondary path filter 34c and the basic signal xc corrected by the sixth secondary path filter 34d are added by the adder 34f to generate the reference signal r1.

The second estimated cancellation signal generating unit 36 generates a second estimated cancellation signal y2^ based on the reference signals r0 and r1 The second estimated cancellation signal generating unit 36 includes a fifth control filter 36a, a sixth control filter 36b, and an adder 36c.

In the second estimated cancellation signal generating unit 36, a SAN filter is used as a control filter W. The fifth control filter 36a has a filter coefficient W0. The sixth control filter 36b has a filter coefficient W1.

The reference signal r0 corrected by the fifth control filter 36a and the reference signal r1 corrected by the sixth control filter 36b are added by the adder 36c to generate a second estimated cancellation signal y2^. The second estimated cancellation signal y2^ is an estimated signal of a signal corresponding to the canceling sound y input to the microphone 22.

An analog-to-digital converter 44 converts the error signal e output from the microphone 22 from an analog signal to a digital signal.

The error signal e is input to an adder 46. The polarity of the estimated noise signal d^ generated by the estimated noise signal generating unit 32 is inverted by an inverter 48, and the inverted signal is input to the adder 46. The polarity of the first estimated cancellation signal y1^ generated by the first estimated cancellation signal generating unit 30 is inverted by an inverter 50 and input to the adder 46. By the adder 46, a first virtual error signal e1 is generated.

The estimated noise signal d^ generated by the estimated noise signal generating unit 32 is input to an adder 52. The second estimated cancellation signal y2^ generated by the second estimated cancellation signal generating unit 36 is input to the adder 52. By the adder 52, a second virtual error signal e2 is generated.

The primary path filter coefficient updating unit 38 updates the filter coefficient H0^ and H1^ based on the basic signals xc and xs, and the first virtual error signal e1. The primary path filter coefficient updating unit 38 updates the filter coefficients H0^ and H1^ based on the LMS algorithm. The primary path filter coefficient updating unit 38 includes a first primary path filter coefficient updating unit 38a and a second primary path filter coefficient updating unit 38b.

The first primary path filter coefficient updating unit 38a and the second primary path filter coefficient updating unit 38b update the filter coefficients H0^ and H1^ based on the following equations. In the equations, n denotes a time step (n=0, 1, 2, . . . ), and μ0 and μ1 denote step size parameters.

$$H0^\wedge_{n+1} = H0^\wedge_n - \mu 0 \times e1_n \times xc_n$$

$$H1^\wedge_{n+1} = H1^\wedge_n - \mu 1 \times e1_n \times xs_n$$

The primary path transfer characteristic H is identified as the primary path filter H^ by repeatedly updating the filter coefficients H0^ and H1^ by the primary path filter coefficient updating unit 38. In the active acoustic control device 10 using the SAN filter, the update equations for the primary path filter coefficient H^ are configured by four arithmetic operations and do not include a convolution operation. Therefore, it is possible to suppress a computational load due to update processing of the filter coefficients H0^ and H1^.

The secondary path filter coefficient updating unit 40 updates the filter coefficients C0^ and C1^ based on the control signals u0 and u1 and the first virtual error signal e1. The secondary path filter coefficient updating unit 40 updates the filter coefficients C0^ and C1^ based on the LMS algorithm. The secondary path filter coefficient updating unit 40 includes a first secondary path filter coefficient updating unit 40a and a second secondary path filter coefficient updating unit 40b.

The first secondary path filter coefficient updating unit 40a and the second secondary path filter coefficient updating unit 40b update the filter coefficients C0^ and C1^ based on the following equations. In the equations, μ2 and μ3 indicate the step size parameters.

$$C0^\wedge_{n+1} = C0^\wedge_n - \mu 2 \times e1_n \times u0_n$$

$$C1^\wedge_{n+1} = C1^\wedge_n - \mu 3 \times e1_n \times u1_n$$

The secondary path transfer characteristic C is identified as the secondary path filter C^ by repeatedly updating the filter coefficients C0^ and C1^ by the secondary path filter coefficient updating unit 40. In the active acoustic control device 10 using the SAN filter, the update equations for the filter coefficients C0^ and C1^ are configured by four arithmetic operations and do not include a convolution operation. Therefore, it is possible to suppress a computational load due to update processing of the filter coefficients C0^ and C1^.

The control filter coefficient updating unit 42 updates the filter coefficients W0 and W1 based on the reference signals r0 and r1, and the second virtual error signal e2. The control filter coefficient updating unit 42 updates the filter coefficients W0 and W1 based on the LMS algorithm. The control filter coefficient updating unit 42 includes a first control filter coefficient updating unit 42a and a second control filter coefficient updating unit 42b.

The first control filter coefficient updating unit 42a and the second control filter coefficient updating unit 42b update the filter coefficients W0 and W1 based on the following equations. In the equations, $\mu 4$ and $\mu 5$ denote the step size parameters.

$$W0_{n+1}=W0_n-\mu 4 \times e2_n \times r0_n$$

$$W1_{n+1}=W1_n-\mu 5 \times e2_n \times r1_n$$

The control filter W is optimized by repeatedly updating the filter coefficients W0 and W1 by the control filter coefficient updating unit 42. In the active acoustic control device 10 using the SAN filter, the update equations for the filter coefficients W0 and W1 are configured by four arithmetic operations and do not include a convolution operation. Therefore, it is possible to suppress a computational load due to update processing of filter coefficients W0 and W1.

[Operation and Advantageous Effects]

Conventionally, in order to perform active acoustic control in the vehicle 12, it is necessary to mount a dedicated control unit of the active acoustic control device 10 in the vehicle 12, and there is a problem of increased cost.

Therefore, the present embodiment causes the smartphone 60 on which the active acoustic control program is installed is to function as the active acoustic control device 10. Accordingly, active acoustic control can be performed in the vehicle 12 into which the smartphone 60 is brought, and there is no need to mount a dedicated control unit in the vehicle 12. Therefore, it is possible to reduce the cost of performing the active acoustic control in the vehicle 12.

Second Embodiment

In the active acoustic control device 10 according to the first embodiment, the frequency detecting circuit 26a detects the control target frequency f, which is a frequency of the muffled sound of the engine 18, based on the engine rotational speed Ne. In an active acoustic control device 10 of the present embodiment, the frequency detecting circuit 26a detects the control target frequency f from the muffled sound of the engine 18 collected by the microphone 22.

Figure 6:
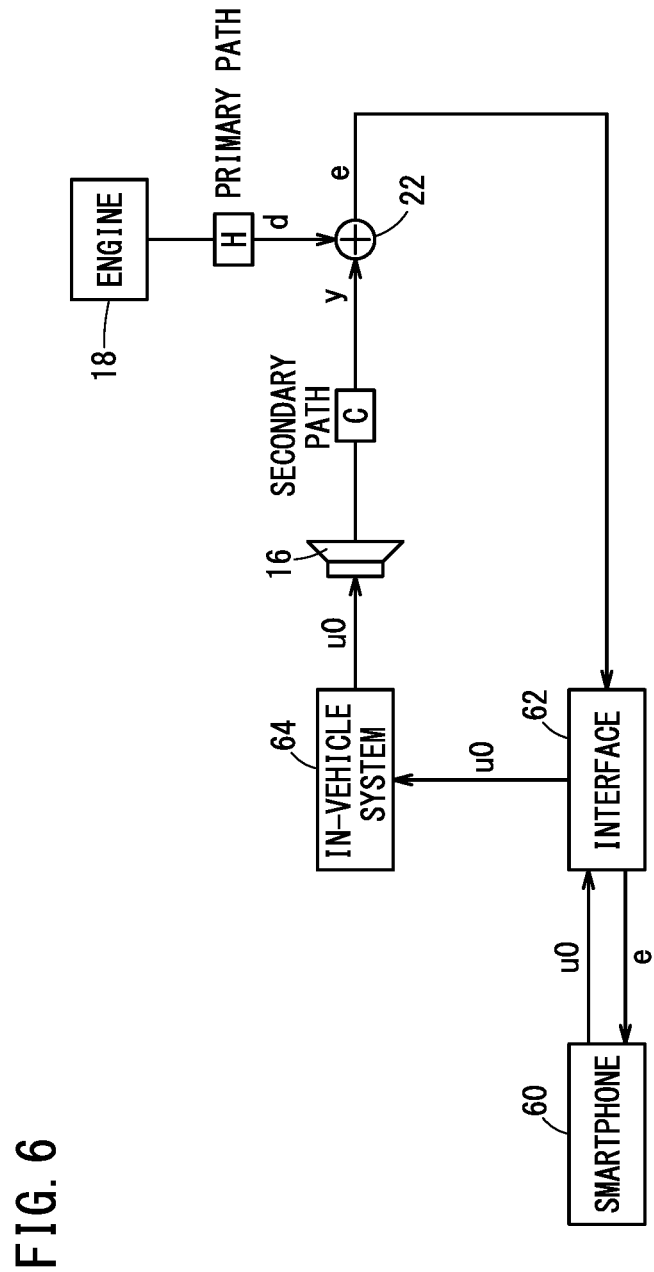
FIG. 6 is an overall system diagram.

FIG. 6 is an overall system diagram of the present embodiment. In the present embodiment, the smartphone 60 on which the active acoustic control program is installed functions as the active acoustic control device 10. The smartphone 60 is connected to the interface 62 by wire.

The interface 62 is connected to the in-vehicle system 64 and the microphone 22 by wire. The interface 62 transmits the error signal e input from the microphone 22 to the smartphone 60. The interface 62 transmits the control signal u0 input from the smartphone 60 to the in-vehicle system 64. The in-vehicle system 64 controls the speaker 16 to output the canceling sound corresponding to the control signal u0.

[Method of Obtaining Control Target Frequency]

In the present embodiment, the frequency detecting circuit 26a passes the error signal e input from the microphone 22 through a low pass filter to remove electronic noise in the error signal e. The frequency detecting circuit 26a obtains the control target frequency f from the error signal e from which the electronic noise has been removed. This error signal e contains a signal corresponding to noise transmitted to a vehicle occupant in the vehicle compartment 14 due to vibration of the engine 18. For obtaining the control target frequency f, methods (1) to (3) will be exemplified below.

<Method (1)>

Figure 7:
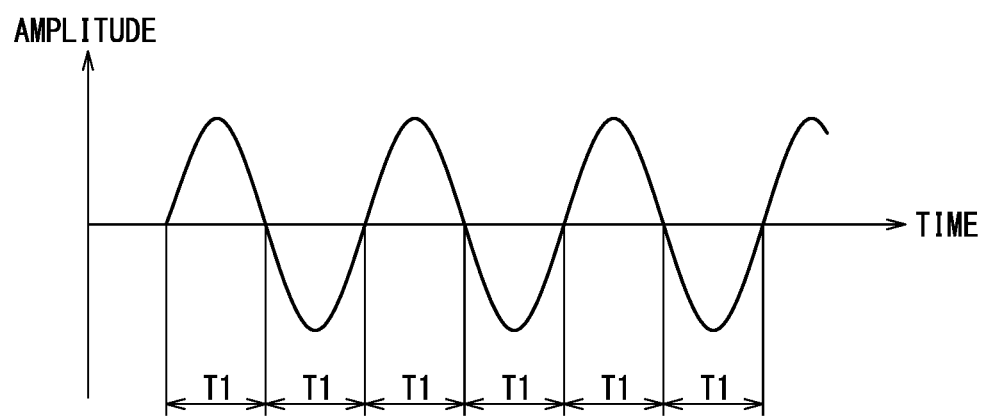
FIG. 7 is a graph illustrating a temporal change of an error signal.

FIG. 7 is a graph illustrating a temporal change in the error signal e from which electronic noise has been removed. The frequency detecting circuit 26a measures a time T1 from a timing at which the error signal e changes from minus to plus to a timing at which the error signal e changes from plus to minus. The control target frequency f can be obtained by the following equation using the time T1.

$$f=1/(2 \times T1)$$

<Method (2)>

Figure 8:
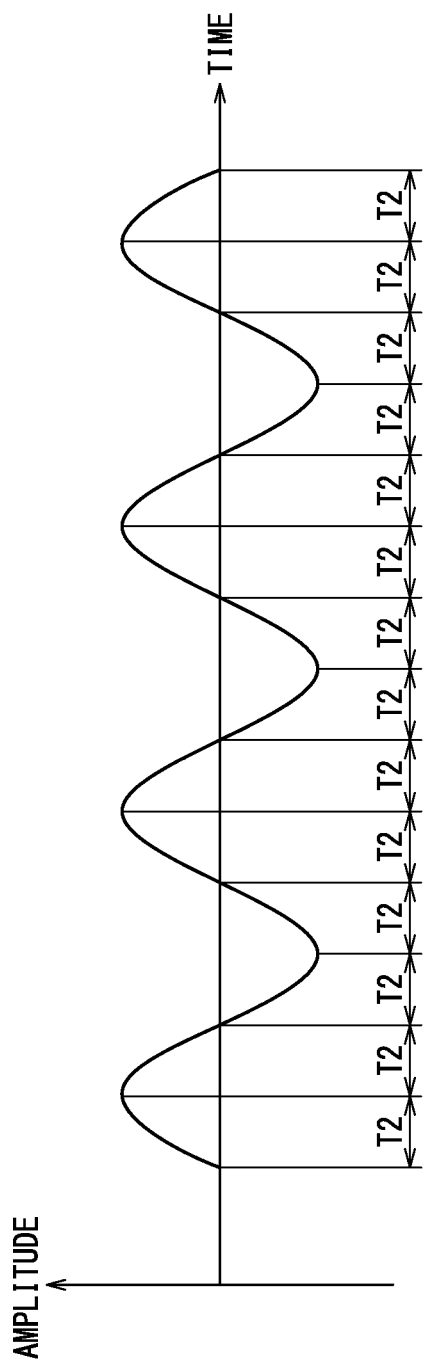
FIG. 8 is a graph illustrating the temporal change in the error signal.

FIG. 8 is a graph illustrating a temporal change in the error signal e from which electronic noise has been removed. The frequency detecting circuit 26a measures a time T2 from a timing at which the error signal e changes from minus to plus to a timing at which an amplitude reaches a peak, and the time T2 from a timing at which the error signal e changes from plus to minus to a timing at which the amplitude reaches a peak. The control target frequency f can be obtained by the following equation using the time T2.

$$f=1/(4 \times T2)$$

Figure 9:
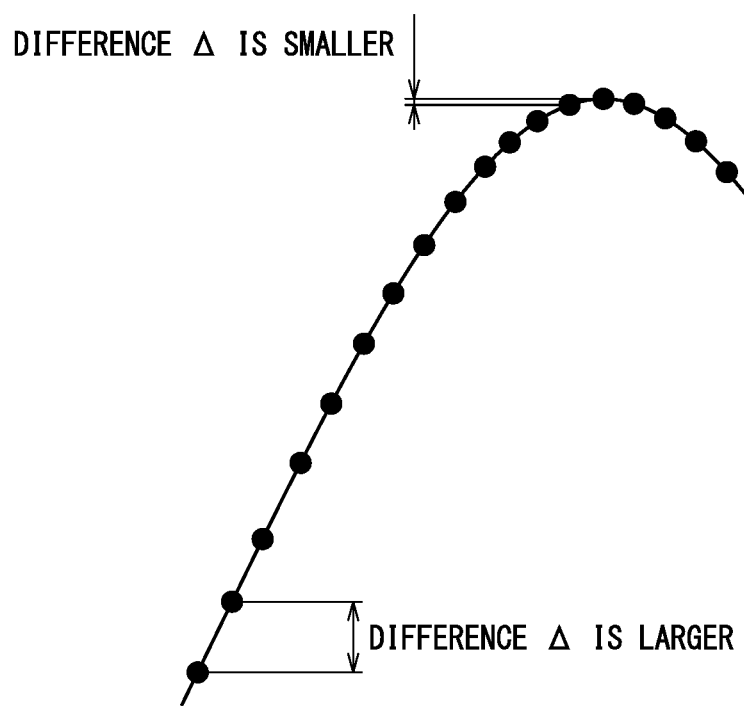
FIG. 9 is a diagram explaining a method of obtaining timing at which an amplitude of the error signal reaches a peak.

The timing at which the amplitude of the error signal e reaches a peak may be obtained as follows. FIG. 9 is a diagram explaining a method of obtaining the timing at which an amplitude of the error signal e reaches a peak. As shown in FIG. 9, data of the magnitude of the error signal e are obtained at predetermined time intervals, and a timing at which a difference Δ between the magnitudes of adjacent data becomes minimum is set as a timing at which the amplitude of the error signal e reaches a peak.

<Method (3)>

Figure 10:
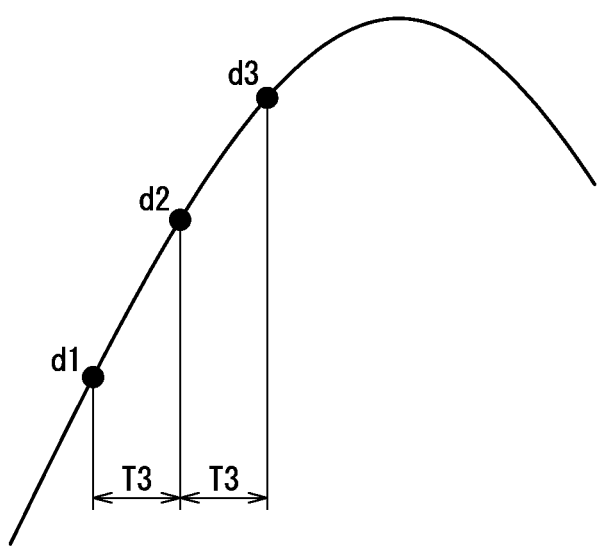
FIG. 10 is a diagram illustrating a method of obtaining a control target frequency.

FIG. 10 is a diagram illustrating a method of obtaining the control target frequency f according to a method (3).

The frequency detecting circuit 26a obtains values d1 to d3 of the magnitude of the electronic-noise-removed error signal e at predetermined time intervals T3, and obtains the control target frequency f based on ratios X1 and X2 of the magnitudes of the values d1 to d3. The ratios X1 and X2 are given by the following equations:

$$X1=d1/d2$$

$$X2=d2/d3$$

[Operation and Advantageous Effects]

In the present embodiment, the frequency detecting circuit 26a detects the frequency of noise caused by the engine 18 and collected by the microphone 22. Thus, the smartphone 60 can perform the active acoustic control without acquiring the engine rotational speed Ne from the vehicle 12.

Third Embodiment

The frequency detecting circuit 26a of the active acoustic control device 10 according to the first embodiment detects the control target frequency f based on the engine rotational speed Ne input to the interface 62 via the CAN. The frequency detecting circuit 26a of an active acoustic control device 10 according to the present embodiment obtains the engine rotational speed Ne from the acceleration of the vehicle 12 detected by the acceleration sensor 76 of the smartphone 60, and detects the control target frequency f based on the obtained engine rotational speed Ne. The acceleration sensor 76 corresponds to an acceleration detecting unit of the present invention.

[Operation and Advantageous Effects]

In the present embodiment, the frequency detecting circuit 26a obtains the engine rotational speed Ne from the acceleration of the vehicle 12 detected by the acceleration sensor 76 of the smartphone 60, and detects the control target frequency f based on the obtained engine rotational speed Ne. Thus, the smartphone 60 can perform the active acoustic control without acquiring the engine rotational speed Ne from the vehicle 12.

Fourth Embodiment

Figure 11:
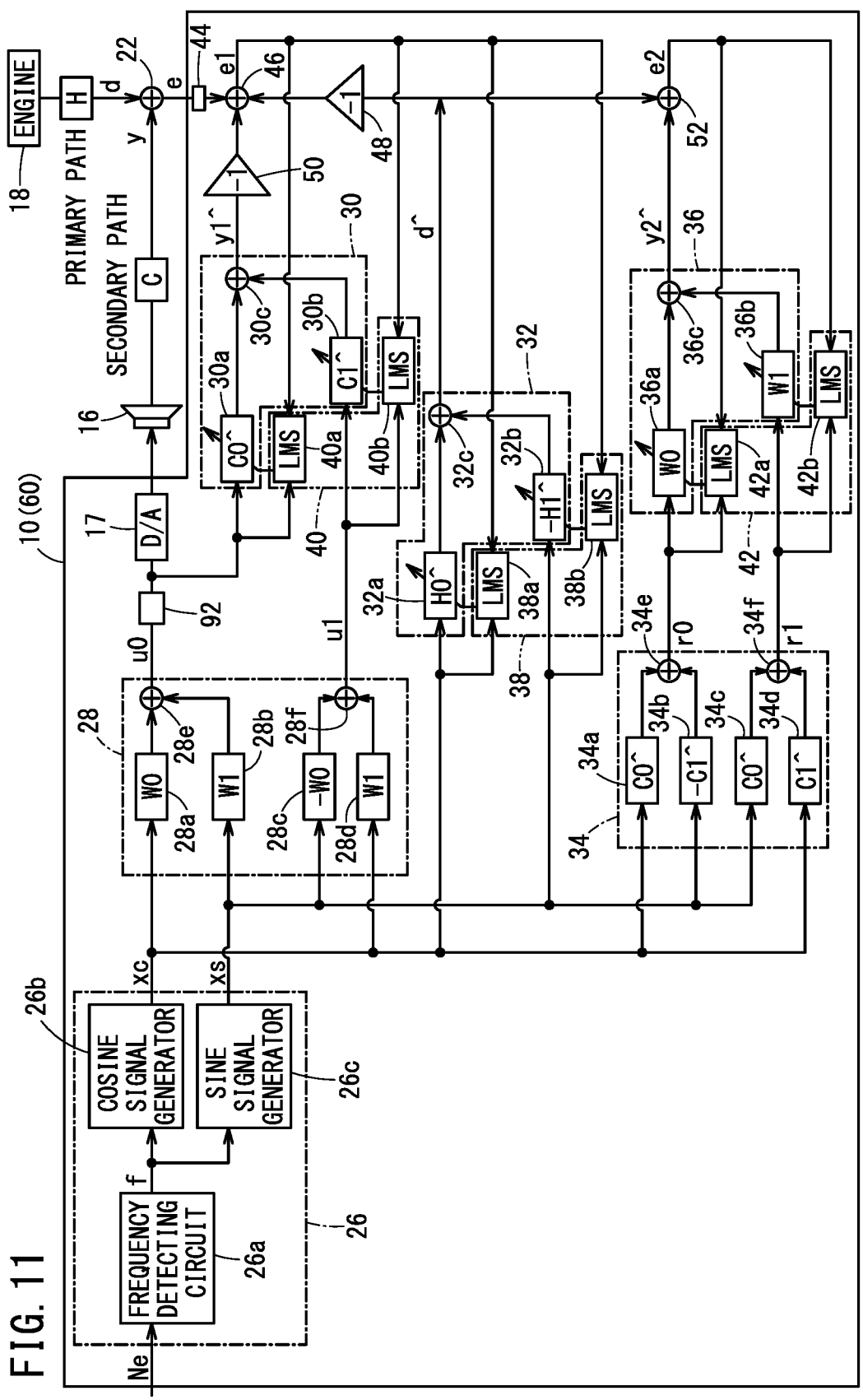
FIG. 11 is a block diagram of an active sound control device.

FIG. 11 is a block diagram of an active acoustic control device 10 of the present embodiment. In the active acoustic control device 10 of the present embodiment, a digital gain 92 is provided with the active acoustic control device 10 of the first to third embodiments.

The in-vehicle system 64 includes a volume operating unit (not shown) that allows the vehicle occupant to adjust the volume output from the speaker 16. The digital gain 92 detects a volume position of the volume operating unit of the in-vehicle system 64.

If the volume operating unit is operated in a direction in which the volume increases, the digital gain 92 makes compensation such that the magnitude of the control signal u0 decreases. In addition, if the volume operating unit is operated in a direction in which the volume decreases, the digital gain 92 makes compensation such that the magnitude of the control signal u0 increases.

Instead of the digital gain 92 compensating the control signal u0 in accordance with the volume position of the volume operating unit, the digital gain 92 may compensate the magnitude of the control signal u0 such that the magnitude of the secondary path filter C^ becomes constant.

[Operation and Advantageous Effects]

In the active acoustic control device 10 of the present embodiment, the control signal u0 is corrected by the digital gain 92 according to the volume position of the volume operating unit. Therefore, it is possible to prevent the volume of the canceling sound output from the speaker 16 from changing in accordance with the volume position of the volume operating unit.

Fifth Embodiment

Figure 12:
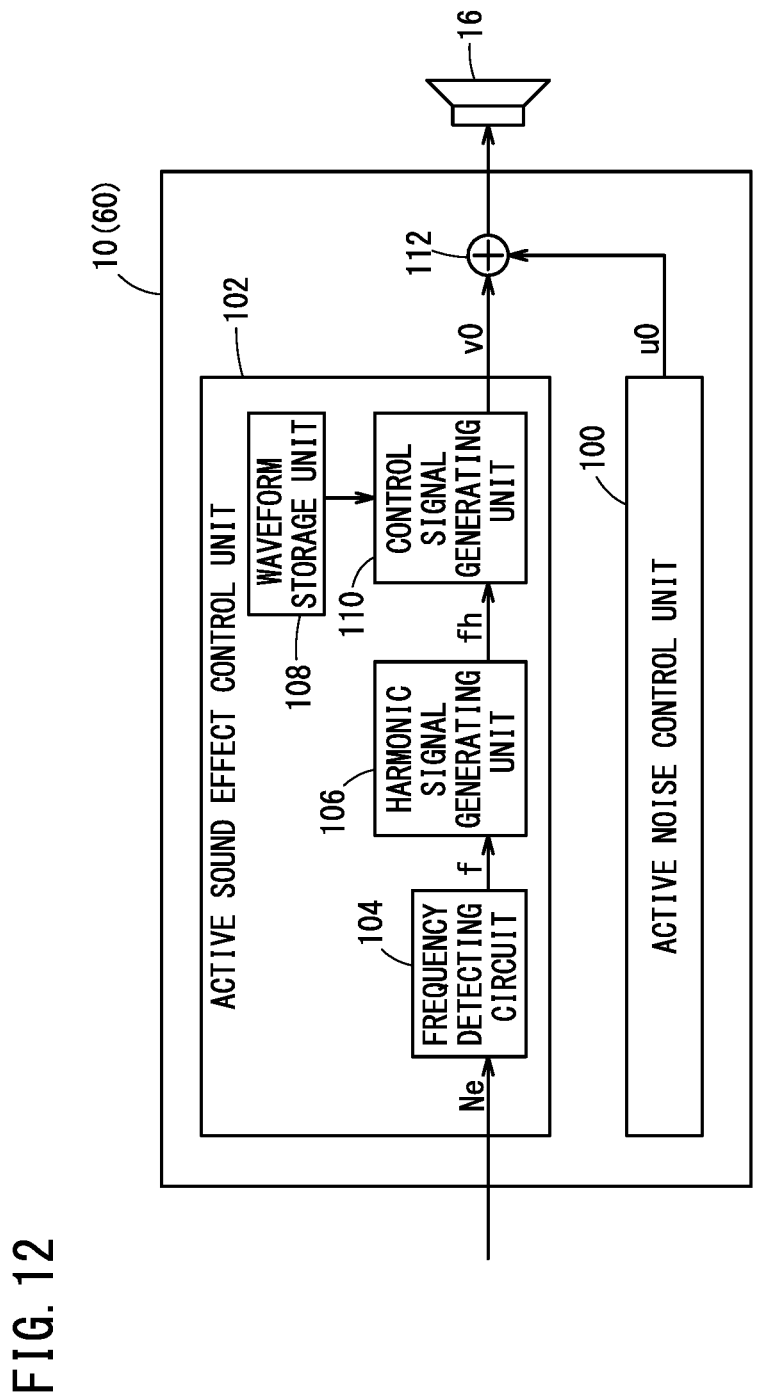
FIG. 12 is a block diagram of an active sound control device.

FIG. 12 is a block diagram of an active acoustic control device 10. The active acoustic control device 10 includes an active noise control unit 100 that performs active noise control and an active sound effect control unit 102 that performs active sound effect control. The configuration of the active acoustic control device 10 according to any one of the first to fourth embodiments is used as the configuration of the active noise control unit 100.

The active sound effect control unit 102 includes a frequency detecting circuit 104, a harmonic signal generating unit 106, a waveform storage unit 108, and a control signal generating unit 110.

The frequency detecting circuit 104 detects the control target frequency f in the same manner as the frequency detecting circuits 26a of the first to fourth embodiments. The harmonic signal generating unit 106 generates a harmonic signal fh that is four times, five times, or six times the control target frequency f. The waveform storage unit 108 stores waveform data having different amplitudes and phases for respective harmonic signals fh. The control signal generating unit 110 generates a control signal v0 based on the waveform corresponding to the harmonic signal fh. The control signal v0 corresponds to a second control signal of the present invention.

The control signal u0 output from the active noise control unit 100 and the control signal v0 output from the active sound effect control unit 102 are added by an adder 112. The speaker 16 is controlled based on the control signal u0 and the control signal v0. Thus, a sound effect imitating an engine sound is output from the speaker 16 together with a canceling sound for reducing noise.

[Operation and Advantageous Effects]

The active acoustic control device 10 according to the present embodiment includes the active noise control unit 100 and the active sound effect control unit 102. Thus, a sound effect imitating an engine sound can be output from the speaker 16 together with a canceling sound for reducing noise.

[Modification 1]

In the first embodiment, the smartphone 60 and the in-vehicle system 64 communicate with each other via the interface 62. Alternatively, the smartphone 60 and the in-vehicle system 64 may directly communicate with each other without using the interface 62.

Figure 13:
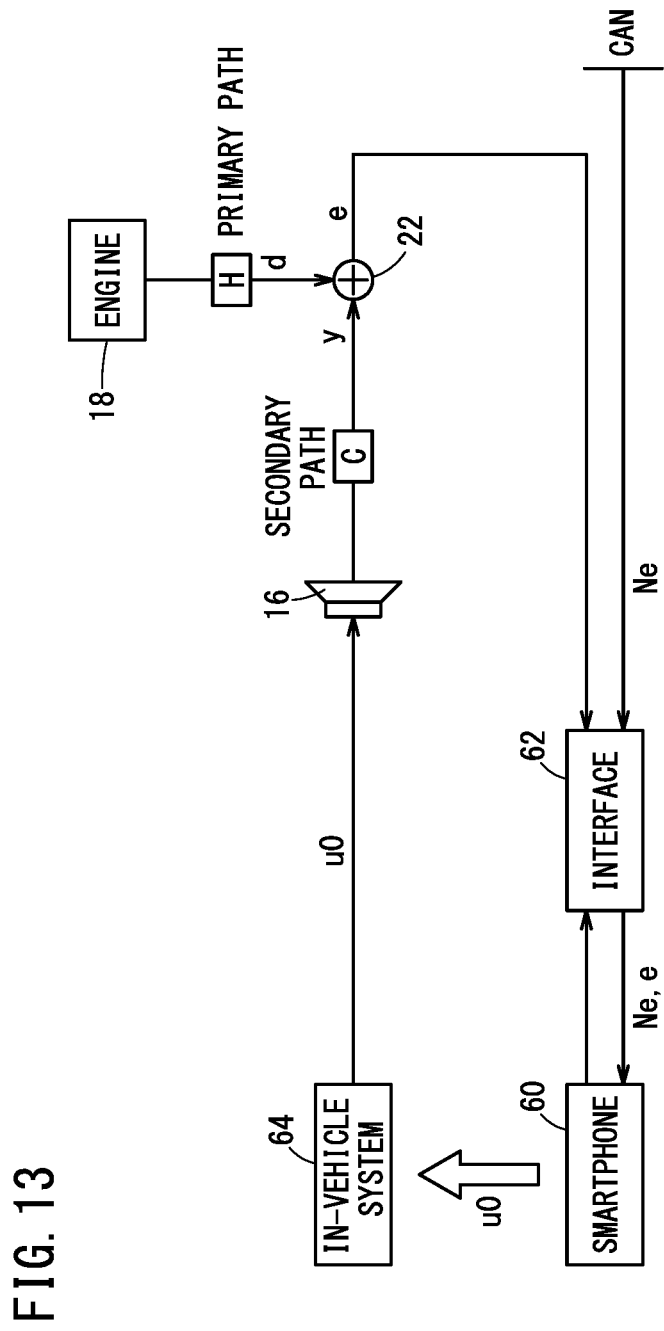
FIG. 13 is an overall system diagram.

FIG. 13 is an overall system diagram of a first modification. The interface 62 is connected to the microphone 22 by wire, but is not connected to the in-vehicle system 64. The smartphone 60 and the in-vehicle system 64 are wirelessly connected to each other.

The interface 62 transmits the input engine rotational speed Ne to the smartphone 60. The interface 62 transmits the error signal e input from the microphone 22 to the smartphone 60. The smartphone 60 wirelessly transmits the control signal u0 to the in-vehicle system 64. The in-vehicle system 64 controls the speaker 16 to output the canceling sound corresponding to the control signal u0.

[Modification 2]

In the active acoustic control device 10 according to the second embodiment, the frequency detecting circuit 26a detects the control target frequency f from the muffled sound of the engine 18 collected by the microphone 22. Alternatively, the frequency detecting circuit 26a may detect the control target frequency f from the muffled sound of the engine 18 collected by the microphone 70 of the smartphone 60.

[Modification 3]

The active acoustic control device 10 (smartphone 60) according to the second embodiment generates the control signal u0 based on the error signal e detected by the microphone 22. Alternatively, the active acoustic control device 10 (smartphone 60) may generate the control signal u0 based on the error signal e detected by the microphone 70 of the smartphone 60.

Further, in the active acoustic control device 10 (smartphone 60) according to the second embodiment, the frequency detecting circuit 26a detects the control target frequency f from the muffled sound of the engine 18 collected by the microphone 22. Alternatively, the frequency detecting circuit 26a may detect the control target frequency f from the muffled sound of the engine 18 collected by the microphone 70 of the smartphone 60.

Figure 14:
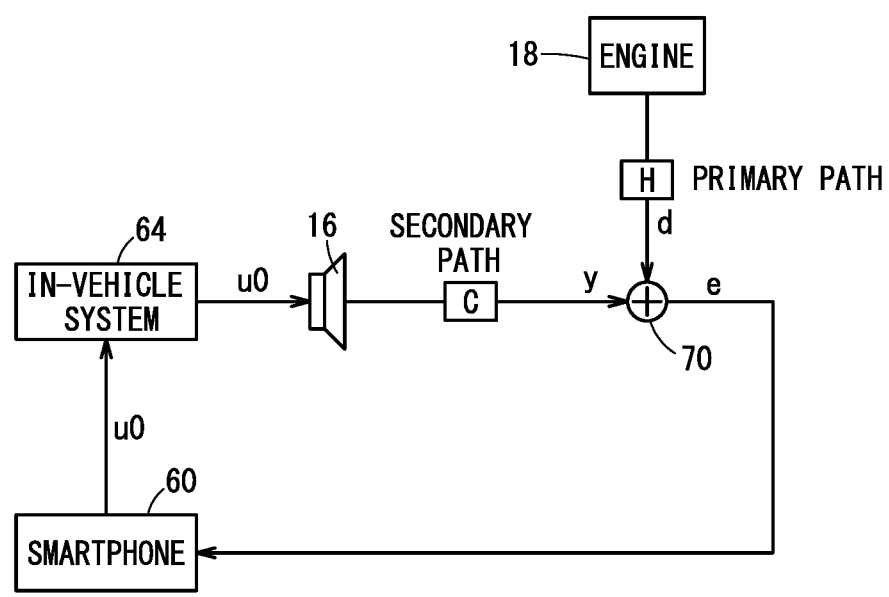
FIG. 14 is an overall system diagram.

FIG. 14 is an overall system diagram of a third modification. The smartphone 60 is connected to the in-vehicle system 64 by wire. The smartphone 60 detects the control target frequency f from the muffled sound of the engine 18 collected by the microphone 70 of the smartphone 60. Further, the smartphone 60 generates the control signal u0 based on the error signal e input from the microphone 70 of the smartphone 60. The smartphone 60 transmits the control signal u0 to the in-vehicle system 64 by wire. The in-vehicle system 64 controls the speaker 16 to output the canceling sound corresponding to the control signal u0.

[Modification 4]

The active acoustic control device 10 (smartphone 60) according to the second embodiment generates the control signal u0 based on the error signal e detected by the microphone 22. Alternatively, the active acoustic control device 10 (smartphone 60) may generate the control signal u0 based on the error signal e detected by the microphone 70 of the smartphone 60.

Further, in the active acoustic control device 10 (smartphone 60) according to the second embodiment, the frequency detecting circuit 26a detects the control target frequency f from the muffled sound of the engine 18 collected by the microphone 22. Alternatively, the frequency detecting circuit 26a may detect the control target frequency f from the muffled sound of the engine 18 collected by the microphone 70 of the smartphone 60.

Figure 15:
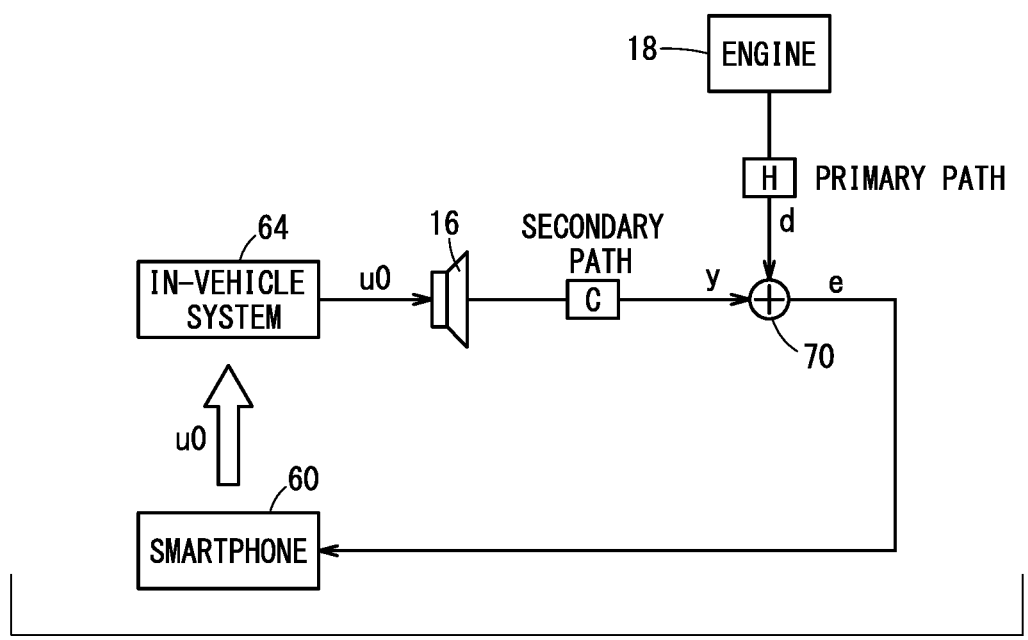
FIG. 15 is an overall system diagram.

FIG. 15 is an overall system diagram of a fourth modification. The smartphone 60 is wirelessly connected to the in-vehicle system 64. The smartphone 60 detects the control target frequency f from the muffled sound of the engine 18 collected by the microphone 70 of the smartphone 60. Further, the smartphone 60 generates the control signal u0 based on the error signal e input from the microphone 70 of the smartphone 60. The smartphone 60 wirelessly transmits the control signal u0 to the in-vehicle system 64. The in-vehicle system 64 controls the speaker 16 to output the canceling sound corresponding to the control signal u0.

[Modification 5]

In the first to fifth embodiments, the smartphone 60 on which the active acoustic control program is installed functions as the active acoustic control device 10. Alternatively, the in-vehicle system 64 on which the active acoustic control program is installed may function as the active acoustic control device 10. The in-vehicle system 64 is In-Vehicle Infotainment (hereinafter also referred to as IVI), and is a user interface that provides information, entertainment content, and the like obtained by connecting to the Internet 66 or other in-vehicle devices.

Figure 16:
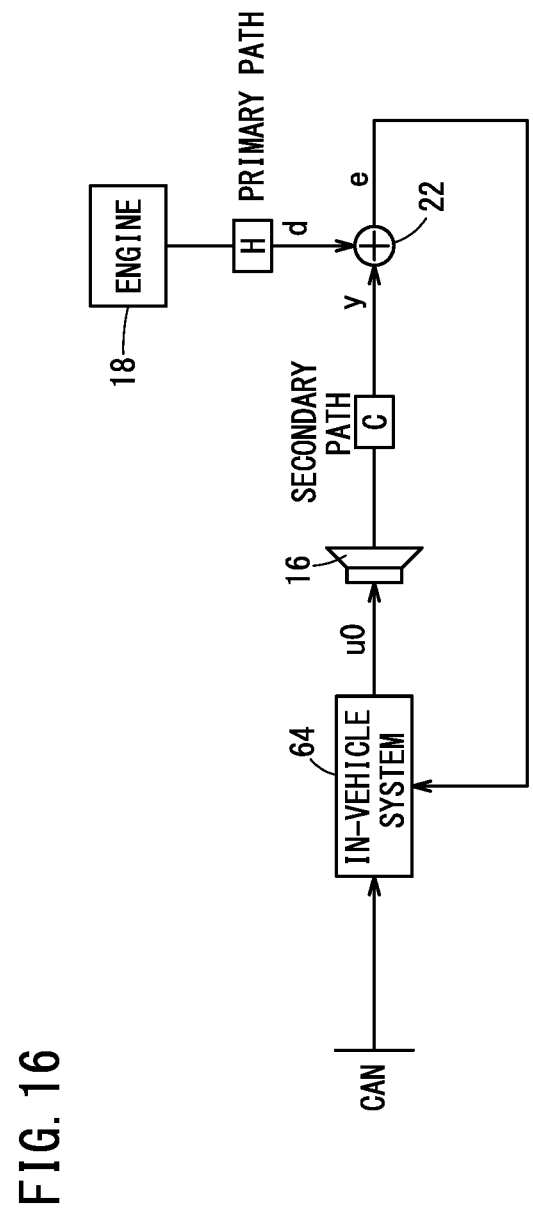
FIG. 16 is an overall system diagram.

FIG. 16 is an overall system diagram of a fifth modification. The in-vehicle system 64 is provided on the CAN. The engine rotational speed Ne is input to the in-vehicle system 64 through the CAN. The in-vehicle system 64 is connected to the microphone 22 by wire.

The in-vehicle system 64 generates the control signal u0 based on the engine rotational speed Ne and the error signal e detected by the microphone 22. The in-vehicle system 64 controls the speaker 16 to output the canceling sound corresponding to the control signal u0.

Technical Idea Obtained from Embodiments

A description will be given below concerning technical concepts that are capable of being grasped from the above-described embodiments.

The mobile terminal (60) that performs at least one of active noise control or active sound effect control, the active noise control generating a first control signal for causing the speaker (16) provided in the vehicle compartment (14) of the vehicle (12) to output a canceling sound in order to reduce a drive source sound transmitted from the drive source (18) into the vehicle compartment, the active sound effect control generating a second control signal for causing the speaker to output a sound effect simulating the drive source sound, wherein the vehicle includes the in-vehicle system (64) configured to control the speaker, and at least one of the first control signal or the second control signal is transmitted to the in-vehicle system.

The vehicle may include the microphone (22) provided in the vehicle compartment, and the mobile terminal may include the frequency acquiring unit (26a) configured to acquire a frequency of the drive source sound collected by the microphone.

The mobile terminal may include the acceleration detecting unit (76) configured to detect an acceleration acting on the mobile terminal, and the frequency acquiring unit configured to acquire a frequency of the drive source sound from the acceleration.

In the above-described mobile terminal, a magnitude of at least one of the first control signal or the second control signal may be compensated in accordance with a volume of sound output from the speaker.

REFERENCE SIGNS LIST

10: active acoustic control device
12: vehicle
14: vehicle compartment
16: speaker
18: engine (drive source)
22: microphone
26a: frequency detecting circuit (frequency acquiring unit)
60: smartphone (mobile terminal)
64: in-vehicle system
76: acceleration sensor (acceleration detecting unit)

The invention claimed is:

1. A mobile terminal that performs at least one of active noise control or active sound effect control, the active noise control generating a first control signal for causing a speaker provided in a vehicle compartment of a vehicle to output a canceling sound in order to reduce a drive source sound transmitted from a drive source into the vehicle compartment, the active sound effect control generating a second control signal for causing the speaker to output a sound effect simulating the drive source sound, the mobile terminal comprising an acceleration detecting unit configured to detect an acceleration acting on the mobile terminal, wherein the vehicle includes an in-vehicle system configured to control the speaker, the in-vehicle system includes a volume operating unit configured to adjust sound volume output from the speaker, the mobile terminal comprises one or more operation processing devices that execute computer-executable instructions stored in a storage, and the one or more operation processing devices execute the computer-executable instructions to cause the mobile terminal to:
determine an engine rotational speed from the acceleration detected by the acceleration detecting unit;
acquire a frequency of the drive source sound based on the engine rotational speed as determined,
based on the frequency of the drive source sound as acquired, generate at least one of the first control signal or the second control signal,
compensate a magnitude of at least one of the first control signal or the second control signal in a manner that the magnitude decreases in accordance with control of the volume operating unit to increase the sound volume output from the speaker,
compensate a magnitude of at least one of the first control signal or the second control signal in a manner that the magnitude increases in accordance with control of the volume operating unit to decrease the sound volume output from the speaker,
transmit at least one of a magnitude-compensated first control signal or a magnitude-compensated second control signal to the in-vehicle system.

* * * * *